(12) United States Patent
Grover et al.

(10) Patent No.: US 12,496,446 B2
(45) Date of Patent: Dec. 16, 2025

(54) METHOD FOR FOCUSED TRANSCRANIAL ELECTRICAL CURRENT STIMULATION

(71) Applicant: CARNEGIE MELLON UNIVERSITY, Pittsburgh, PA (US)

(72) Inventors: Pulkit Grover, Pittsburgh, PA (US); Chaitanya Goswami, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 0 days.

(21) Appl. No.: 18/021,257

(22) PCT Filed: Sep. 22, 2022

(86) PCT No.: PCT/US2022/044337
§ 371 (c)(1),
(2) Date: Feb. 14, 2023

(87) PCT Pub. No.: WO2023/200471
PCT Pub. Date: Oct. 19, 2023

(65) Prior Publication Data
US 2024/0278011 A1    Aug. 22, 2024

Related U.S. Application Data

(60) Provisional application No. 63/247,996, filed on Sep. 24, 2021.

(51) Int. Cl.
*A61N 1/36* (2006.01)
*G06V 10/25* (2022.01)

(52) U.S. Cl.
CPC ......... *A61N 1/36025* (2013.01); *G06V 10/25* (2022.01)

(58) Field of Classification Search
CPC .... A61N 1/36025; G06V 10/25; G16H 20/30; G16H 50/20
See application file for complete search history.

(56) References Cited

U.S. PATENT DOCUMENTS

| | | |
|---|---|---|
| 5,069,851 A | 12/1991 | Hicks |
| 9,474,891 B2 | 10/2016 | Demers |
| 2010/0237544 A1 | 9/2010 | Niebling |
| 2015/0112403 A1 | 4/2015 | Ruffini |
| 2016/0347378 A1 | 12/2016 | Osten |

FOREIGN PATENT DOCUMENTS

WO    2023200471 A2    10/2023

OTHER PUBLICATIONS

Fernandez-Corazza, Mariano et al. "Unification of optimal targeting methods in transcranial electrical stimulation." NeuroImage vol. 209 (2020): 116403.

(Continued)

*Primary Examiner* — Mark W. Bockelman
(74) *Attorney, Agent, or Firm* — KDW FIRM PLLC

(57) ABSTRACT

Disclosed herein is a method for optimizing electrode placement that directly exploits the thresholding phenomenon of neurons. The method employs a loss function which only becomes non-zero when the electric field is above a user-specified threshold in the cancel region, thereby allowing for fields which can have significant non-zero current in the cancel region, but still provide more focused neural activation.

9 Claims, 1 Drawing Sheet
(1 of 1 Drawing Sheet(s) Filed in Color)

(56) References Cited

OTHER PUBLICATIONS

International Search Report and Written Opinion for the International Application No. PCT/US2022/076419, mailed Nov. 21, 2022, 7 pages.

The International Search Report and The Written Opinion of The International Application No. PCT/US2022/044337, date mailed Oct. 19, 2023, 8 pages.

Saturnino et al., "Accessibility of cortical regions to focal TES: Dependence on spatial position, safety, and practical constraints," NeuroImage 203, 2019, 17 page. [retrieved on Sep. 26, 2023] Retrieved from the Internet. https://www.sciencedirect.com/science/article/pii/S1053811919307748.

Goswami et al. HingePlace: Focused transcranial electrical current stimulation that allows subthreshold fields outside the stimulation target. 43rd Annual International Conference of the IEEE Engineering in Medicine & Biology Society (EMBC), 2021, 1577-1583. [Retrieved on Sep. 26, 2023]. Retrieved from the Internet. https://ieeexplore.ieee.org/document/9630436.

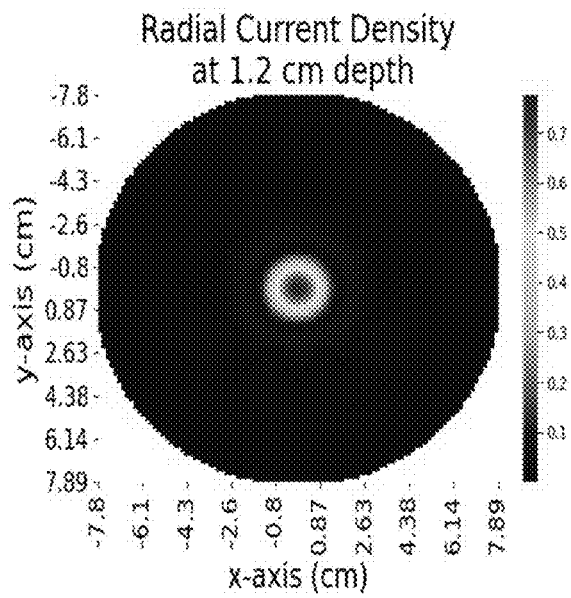
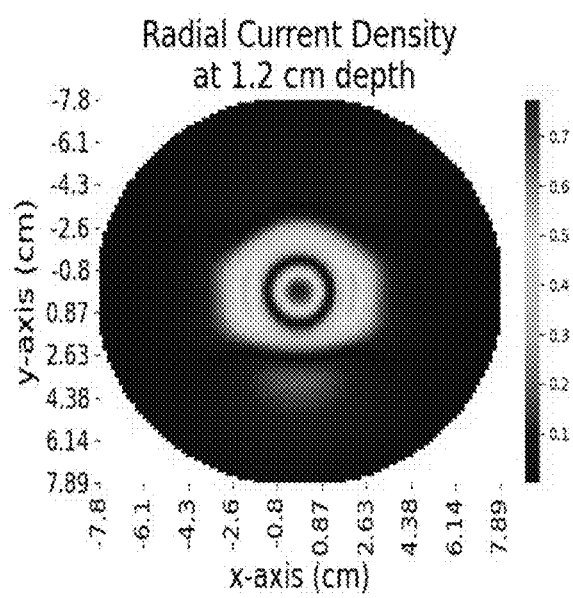
FIG. 1A
FIG. 1B
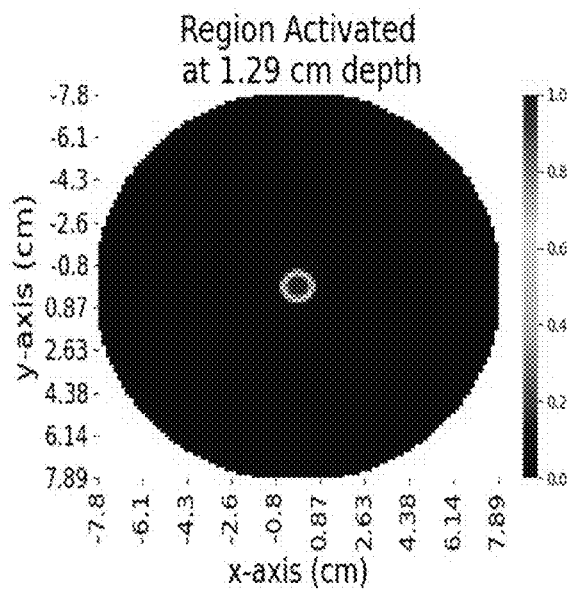
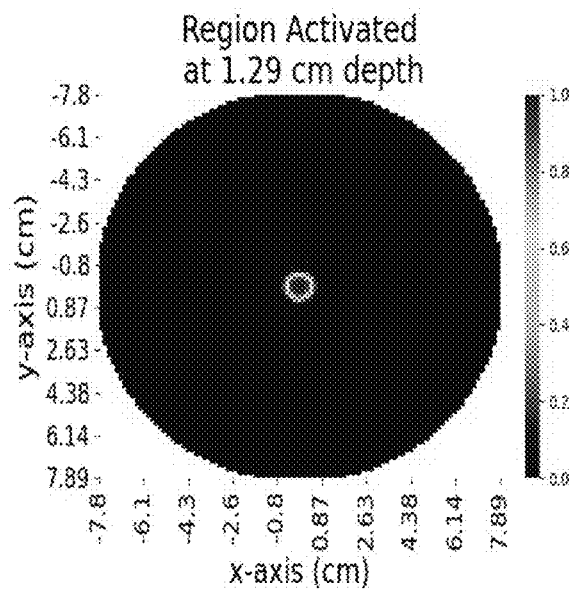
FIG. 1C
FIG. 1D

METHOD FOR FOCUSED TRANSCRANIAL ELECTRICAL CURRENT STIMULATION

RELATED APPLICATIONS

This application claims the benefit of U.S. Provisional Patent Application No. 63/247,996 filed Sep. 24, 2021, the contents of which are incorporated herein by reference in their entirety.

GOVERNMENT INTEREST

This invention was made with U.S. government support under contract N6523619C8017 awarded by the United States Department of the Navy. The U.S. government has certain rights in this invention.

BACKGROUND OF THE INVENTION

Transcranial Electrical Stimulation (TES) is a general term used for either stimulating or modulating the neural activity of the brain using electrical currents delivered from electrodes placed at the scalp. TES is a promising therapeutic tool for many neurological diseases and disorders, including, but not limited to, clinical depression, chronic pain, Parkinson's, and many more.

Traditionally, TES is performed using two large electrodes (a cathode and an anode) to induce electric current into the brain. This arrangement of electrodes creates a diffused field in the brain causing a widespread stimulation/modulation, even when only a focal stimulation is desired. In recent years, advances have been using multielectrode TES arrangements and current patterns that create fields which only have significant amplitude in a region of interest. For example, the motor or somatosensory cortex. Such multielectrode arrangements can improve focality, which can improve the clinical efficacy of TES-based therapies and help develop more precise brain-machine interfaces.

The problem of designing such electrode montages and the injected current amplitudes is a problem of electrode placement. Fundamentally, there are two primary challenges that make the problem of electrode placement hard. First, laws of physics dictate that the currents generated by the electrodes at the scalp diffuse as they travel through the layers of head (i.e., the scalp, skull and cerebrospinal fluid), making it hard to constrain the area of stimulation. Second, to avoid pain or tissue damage in the scalp, the current at each electrode, and the total current that is injected into the scalp, cannot be too high, making it hard to create high-amplitude electric fields in the brain.

Existing works formulate the problem of electrode placement as a search/optimization problem. They divide the brain into two regions: a region of interest where it is desirable that the field be high, referred to as the "focus region, and the remaining region of "non-interest" where it is desirable that field is low, referred to as the "cancel region".

The optimization problem is set up in such a way that its solution is an electrode montage that produces the smallest electric field (i.e., as close to zero as possible) in the cancel region, given a desired amplitude of electric field in the focus region. These algorithms succeed in producing focused fields, and, consequently, focused stimulation, in simplified models (ranging from spherical head models to real-head models). While the existing electrode placement algorithms are successful in creating focused electric fields, they do not explicitly take advantage of the non-linear nature of neurons, especially the thresholding phenomenon of neurons, wherein neurons only fire when the stimulating field is above a certain threshold. For focused stimulation, one does not require electric fields to be minimized in the cancel region. Instead, it is sufficient that it be below the stimulation threshold (which depends on the stimulating waveform but is fixed for a given waveform).

Thus, there is a need for a method of obtaining the desired electrical field in the focus region, while keeping the field in the cancel region below the stimulation threshold, such as to not cause the neurons in the cancel region to fire.

SUMMARY OF THE INVENTION

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Disclosed herein is a method for optimizing electrode placement that directly exploits the thresholding phenomenon of neurons. The method employs a loss function which only becomes non-zero when the electric field is above a user-specified threshold ($E_{tol}$) in the cancel region, thereby allowing for fields which can have significant non-zero current in the cancel region, but still provide more focused neural activation.

The improvement in performance provided by the invention is quantified by comparison with a prior art method referred to as the Directionally Constrained Maximization (DCM) algorithm, in simulated (spherical head) models. DCM has been shown to subsume most of the existing TES electrode placement algorithms proposed in the prior art, and therefore is a good candidate for comparison.

The disclosed method performs strictly better than DCM in terms of the area of stimulation (approximated by area of the electric field above a certain pre-defined threshold), providing as much as a 20% reduction in stimulated area when the allowed injected current at each electrode is moderately high (see FIG. 2).

The disclosed method specifies an optimization framework that keeps the fields outside of the focus region below a specified threshold ($E_{tol}$, which is the "tolerable" level of the field). The disclosed method is first specified, with an explicit explanation of why prior art algorithms minimize the fields outside the region of focus, instead of simply keeping the fields them below a threshold.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the drawings, like reference characters generally refer to the same parts throughout the different views. In the following description, various embodiments of the present invention are described with reference to the following drawings, in which:

FIG. 1 shows a comparison between the currently disclosed method and the prior art DCM method, showing differences in the current density and the activated regions generated by the respective methods.

DETAILED DESCRIPTION

The present invention is directed a method for arranging the electrodes and applying power such as to maximize the field in the focus regions while maintaining the field in the cancel region below the stimulation threshold. The method exploits the thresholding phenomenon of neurons by designing multi-electrode arrangements which allow the electric fields outside the target region to be non-zero, but still below the stimulation threshold.

Assume that $N \in \mathbb{N}$ locations are chosen on the scalp, where electrodes are to be replaced. Let $I=[i_1, \ldots, i_N] \in \mathbb{R}^N$ be an N-dimensional vector, where $i_j$ represents the current injected at the $j^{th}$ location. If no electrode is placed at the $j^{th}$ electrode location, then the corresponding $i_j=0$. Therefore, the vector I completely describes an electrode montage, and the problem of electrode placement can be reduced to finding the "optimal" I. A frequent assumption made in electrode placement algorithms is that the physics of the electrode placement problem is governed by the quasi-static Maxwell equations. Therefore, given the conductivities and geometries of all the layers of the head, namely the scalp, the skull, the cerebrospinal fluid (CFS) and the white and grey matter of the brain, and the current (injected by the electrodes) at each of the locations, the field in the brain can be calculated using the Laplace equation. The solution of the Laplace equation can be found by discretizing the head model and solving it using a numerical technique such as Finite Element Method (FEM). This discretization yields the following linear system:

$$TI = E_I \quad (1)$$

where:
$T \in \mathbb{R}^{3M \times N}$;
$E_I \in \mathbb{R}^{3M}$;
M (typically $>>$N) is the number of voxels into which the head model is discretized;
$E_I$ is the electric field induced in the head in x, y and z directions (i.e., 3M); and
T is the transfer matrix/function that maps the injected currents to the induced electric field $E_I$.

T only depends on the conductivity and geometry of the head model. Using the above formulation, the problem of electrode placement can be conceptualized as two sub-problems: (a) Let the focus region be denoted by F and the cancel region be denoted by C. Then DCM seeks to maximize the current/electric field intensity along the direction $\vec{d}=[d_x, d_y, d_z]$ in the focus region, while minimizing the field magnitude in the cancel region through the following optimization:

$$I^* = \arg \max_I D^T \Gamma_F T_f I \quad (2)$$

$$\text{s.t. } I^T T_c^T \Gamma_c T_c I \leq \alpha, \|I\|_1 \leq 2I_{tot}, \|I\|_\infty \leq I_{safe}, 1_N^T I = 0$$

The first term $D^T \Gamma_F T_f I$ is a discrete approximation of the integral of the electric field along the direction $\vec{d}$ in the focus region (i.e., $\int_{\vec{r} \in F} \vec{d} \cdot \vec{E_I}(\vec{r}) dV$. Here, $D \in \mathbb{R}^{3N \times 1}$ is the vector denoting the direction along which the electric field for each voxel in F should be projected. $\Gamma_F \in 3N \times 3|F|$ (where $|F|$ is the number of voxels present in the focus region) is the matrix that results due to the integration operation, and its elements are just volumes of each voxel in the focus region. $T_f \in \mathbb{R}^{3|F| \times N}$ is the matrix constructed from sub-sampling the rows of the transfer matrix T, which correspond to the voxels lying in the focus region F. Therefore, $T_f I$ is the electric field $E_I$ for each voxel in the focus region. The optimization problem seeks to maximize the integral of electric field along the direction $\vec{d}$ in the focus region, which is equivalent to maximizing the average intensity of the electric field in the focus region along $\vec{d}$.

The quadratic term $I^T T_c^T \Gamma_c T_c I$ represents the energy of the electric field in the cancel region C. The particular form of the quadratic term again stems from discretizing the integral for calculating the energy of the field in the cancel region:

$$\int_{\vec{r} \in C} \left\| \vec{E_I}(\vec{r}) \right\|_2^2 dV$$

Here, $T_c \in \mathbb{R}^{3|C| \times N}$ (where $|C|$ is the number of voxels present in the cancel region) is the matrix constructed from sub-sampling the rows of the transfer matrix T, which corresponds to the voxels lying in the cancel region C, and $\Gamma_c \in 3|C| \times 3|C|$ is a diagonal matrix that results due to the integration operation, with the diagonal elements being just volumes of each voxel in the cancel region. Therefore, the constraint $I^T T_c^T \Gamma_c T_c I \leq \alpha$ bounds the electric energy below a certain threshold.

The constraint $\|I\|_1 \leq 2I_{tot}$ restricts the total current being injected from the electrode montage to $I_{tot}$ and the constraint $\|I\|_\infty \leq I_{safe}$ restricts the maximum current injected per electrode to $I_{safe}$, to ensure safe stimulation. The constraint $1_N^T I = 0$ is present for satisfying Kirchhoff's law (i.e., the amount of current going into the head should be equal to the amount of current going out). For the sake of brevity, herein, $D^T \Gamma_F T_f$ is denoted by $A_f$ and $I^T T_c^T \Gamma_c T_c I$ is denoted by $\|A_c I\|_2^2$ (which also defines $A_c$).

As previously discussed, it is not obvious from the formulation described in Eq. (2) that DCM minimizes the electric field in the cancel region. Therefore, to prove that DCM minimizes the electric field in the cancel region, the following optimization formulation is defined:

$$I^* = \arg \max_I \|A_c I\|_2^2 \quad (3)$$

$$\text{s.t. } A_f I = E_{des}, \|I\|_1 \leq 2I_{tot}, \|I\|_\infty \leq I_{safe}, 1_N^T I = 0$$

Solving Eq. (3) is equivalent to solving Eq. (2). As can be seen from Eq. (3), the ideal optimal I for DCM would be the one which satisfies $A_c I=0$, and $A_f I=A_{des}$. Therefore, DCM and by extension all the algorithms subsumed under it over-penalizes the electric field in the cancel region and do not try to take advantage of the thresholding phenomenon of neurons.

The disclosed method provides an optimization framework that explicitly takes advantage of the thresholding phenomenon of neurons. The optimization framework is given by the equation:

$$I^* = \arg \max_{I \in \mathbb{R}^N} \mathrm{diag}(\Gamma_c)^T \max(0, T_c I - E_{tol}^+) + \mathrm{diag}(\Gamma_c)^T \max(0, -T_c I - E_{tol}^-) \quad (4)$$

$$\text{s.t. } A_f I = E_{des}, \|I\|_1 \leq 2I_{tot}, \|I\|_\infty \leq I_{safe}, 1_N^T I = 0$$

where:
- diag($\Gamma_C$) ∈ $\mathbb{R}^{3|C| \times 1}$ is a vector consisting of all of the diagonal elements of $\Gamma_C$,
- max(•) is applied element-wise to each of the vectors; and
- $E_{tol}^+$, $E_{tol}^- \in \mathbb{R}^{3|C|}$, whose elements specifies the level of electric field that is tolerable in each voxel of the cancel region.

A common choice for $E_{tol}^+$ and $E_{tol}^-$ is $E_{tol} 1_{3|C|}$, where $1_{3|C|}$ is the vector of all ones, and $E_{tol}$ is some global level of electric field that is tolerable. For the sake of brevity, we will denote the loss function in Eq. (4) is denoted as:

$$L_H(I) = \text{diag}(\Gamma_c)^T \max(0, T_c I - E_{tol}^+) + \text{diag}(\Gamma_c)^T \max(0, -T_c I - E_{tol}^-) \quad (5)$$

The solution (i.e., the electrode montage) produced by the DCM is equivalent to the solution derived by the disclosed method (derived with the same constraints on electrode currents on the scalp and the electric field created in the focus region) when $E_{tol}$ is very low zero or near zero. If $E_{tol}$ is chosen to be very low, the difference between neural activation between DCM and the disclosed method is functionally equivalent. The $\alpha$ term in Eq. (2) indicates the desired field in the focus region, as does the $E_{des}$ term in Eq. (4). The $\alpha$ term does not dictate the tolerable strength of the field in the cancel region ($E_{tol}$).

The only difference between Eq. (4) and Eq. (3) is in their loss functions (i.e., $L_H(I)$ for the disclosed method and an $l_2$ norm constraint $\|A_c I\|_2^2$ in case of DCM-type approaches. The role of the constraints in Eq. (4) is the same as it was in DCM.

$L_H(I)$ can be thought of as a discretized version of the following integral:

$$\int_C \max\left(0, \vec{E}(\vec{r}) - \vec{E}_{tol}^+(\vec{r})\right) + \max\left(0, -\vec{E}(\vec{r}) - \vec{E}_{tol}^-(\vec{r})\right) dV$$

$L_H(I)$ will have a non-zero value only if any component of $\vec{E}(\vec{r}) \geqslant \vec{E}_{tol}^+(\vec{r})$ or $\vec{E}(\vec{r}) \leqslant \vec{E}_{tol}^-(\vec{r})$ where ⩾, ⩽ represent elementwise inequalities. Hence, $L_H(I)$ only penalizes the electric fields which violate their upper or lower thresholds in the cancel region, thereby allowing fields having non-zero (albeit below pre-defined thresholds) amplitudes in the cancel region. In contrast, DCM-type approaches minimize the electric field and bring the fields as close to 0 as possible. Because of this, DCM-type approaches are overly-restrictive in that they disallow fields which have significant non-zero electric field (but below the stimulation threshold of neurons outside of the target region, even if they provide better focus. In contrast, the disclosed method does not penalize such electric fields, and can actually find such fields which can lead to potentially more focused neural stimulation.

This is illustrated in FIGS. 1A-1D. FIG. 1A shows a current density generated by DCM at the upper hemisphere of the shell at the depth of 1.3 cm projected onto the x, y plane, while FIG. 1B shows the current density generated by the disclosed method at the upper hemisphere of the shell at the depth of 1.3 cm projected onto the x, y plane. FIG. 1C shows the corresponding region of the electric field shown in FIG. 1A that leads to neural stimulation for DCM (approximated by area above 80% of the maximum field), while FIG. 1D shows the corresponding region of the electric field shown in FIG. 1B that leads to neural stimulation for the disclosed method (approximated by area above 80% of the maximum field).

A new approach for electrode placement has been described that explicitly exploits the thresholding phenomenon of neurons to achieve focal neural stimulation. A In comparison with DCM, which subsumes a large class of electrode placement algorithms, the invention provides significant gains in terms of focality.

The neural response of the brain to transcranial fields is approximated by a thresholding function. While it is commonly believed that, to a first order, the neural response can be approximated by a thresholding function (e.g., for fixed waveform shape, and changing amplitude), actual neural responses are quite complex. For purposes of explanation of the invention, only one neuron-type is assumed to be present. This best approximates gyri in the cortex where cortical columns have a fairly regular structure with similar cell-types. There is known to be significant variability in the thresholds of neurons (across types, and even within the same type), which can make choosing the threshold for the disclosed method difficult, as a high threshold might lead to spurious stimulation in the cancel region, and a low threshold might lose the advantages offered by the disclosed method. Additionally, even though electric fields might be low enough to not cause neural stimulation, they still might modulate the activity of neurons, so care might be needed while using the disclosed method. However, even using the simplest of non-linear neural response (i.e. thresholding), significant gains was realized compared to existing algorithms. This shows the potential of incorporating knowledge of neuron-types and neural dynamics while designing TES electrode placement algorithms. Neurons are highly non-linear systems, which makes them hard to analyze but at the same time allows creative strategies to harness this non-linearity to potentially improve performance.

As would be realized by one of skill in the art, the disclosed systems and methods described herein can be implemented by a system comprising a processor and memory, storing software that, when executed by the processor, performs the functions comprising the method. For example, the optimization method can be implemented by software executing on a processor.

As would further be realized by one of skill in the art, many variations on implementations discussed herein which fall within the scope of the invention are possible. Specifically, many variations of the parameters, the components used, and their arrangement could be used to obtain similar results. The invention is not meant to be limited to the particular exemplary model disclosed herein. Moreover, it is to be understood that the features of the various embodiments described herein were not mutually exclusive and can exist in various combinations and permutations, even if such combinations or permutations were not made express herein, without departing from the spirit and scope of the invention. Accordingly, the method and apparatus disclosed herein are not to be taken as limitations on the invention but as an illustration thereof. The scope of the invention is defined by the claims (and their equivalents) which follow.

The invention claimed is:

1. A method for optimizing electrode placement for transcranial electrical current stimulation of a brain comprising:
   placing a plurality of electrodes at a plurality of locations on a scalp, the placement being represented by an N-dimensional vector wherein each dimension of the vector represents a current applied at a single electrode location;

discretizing the brain into a plurality of voxels;

mapping, for each voxel, an electric field induced in the voxel by current applied to each of the plurality of electrodes;

identifying a focus region comprising a first set of voxels and a cancel region comprising a second set of voxels;

optimizing placement of the plurality of electrodes to maximize the induced electric field in the focus region while maintaining the electric field induced in the cancel region below a predetermined threshold;

wherein the N-dimensional vector is optimized by a loss function that penalizes electric fields in voxels in the cancel region that violate the predetermined threshold.

2. The method of claim 1 wherein the loss function further penalizes electric fields in the cancel region that violate a predetermined lower threshold.

3. The method of claim 1 wherein the predetermined threshold is non-zero.

4. The method of claim 3 wherein the loss function only becomes non-zero when the electric field in the cancel region exceeds the predetermined threshold.

5. The method of claim 1 wherein the electric field induced in the cancel region is not minimized.

6. The method of claim 1 wherein the predetermined threshold is a maximum electric field in the cancel region that is below a stimulation threshold of neurons in the cancel region.

7. The method of claim 6 wherein the stimulation threshold is dependent on the stimulation waveform.

8. The method of claim 1 wherein the predetermined threshold is user-specified.

9. The method of claim 1 wherein a transfer function maps the current injected at each electrode location to the electric field induced in each voxel and further wherein the transfer function is dependent on the conductivity and geometry of a head model containing the brain.

* * * * *